US012478968B2

(12) United States Patent
Wright

(10) Patent No.: US 12,478,968 B2
(45) Date of Patent: Nov. 25, 2025

(54) DIAGNOSTIC ASSAY AND THERAPEUTIC FLUID DELIVERY BLISTER ACTUATOR AND DIAGNOSTIC ASSAY AND THERAPEUTIC FLUID DELIVERY CARTRIDGE THEREWITH

(71) Applicant: Creganna Unlimited Company, Ballybrit (IE)

(72) Inventor: David W. Wright, Littleton, CO (US)

(73) Assignee: CREGANNA UNLIMITED COMPANY, Ballybrit (IE)

(*) Notice: Subject to any disclaimer, the term of this patent is extended or adjusted under 35 U.S.C. 154(b) by 960 days.

(21) Appl. No.: 17/669,611

(22) Filed: Feb. 11, 2022

(65) Prior Publication Data

US 2022/0258165 A1 Aug. 18, 2022

Related U.S. Application Data

(60) Provisional application No. 63/149,132, filed on Feb. 12, 2021.

(51) Int. Cl.
*B01L 3/00* (2006.01)
*B65B 69/00* (2006.01)

(52) U.S. Cl.
CPC .............. *B01L 3/52* (2013.01); *B65B 69/005* (2013.01); *B01L 2200/0605* (2013.01); *B01L 2200/16* (2013.01); *B01L 2400/0481* (2013.01)

(58) Field of Classification Search
CPC .... B01L 3/52; B01L 3/0293; B01L 3/502715; B01L 3/523; B01L 3/527; B01L 2200/0605; B01L 2200/16; B01L 2200/025; B01L 2400/0481; B01L 2400/0683; B01L 9/527; B01L 2300/043; B65B 69/005
USPC ............... 422/521, 522, 554, 413; 435/287.6
See application file for complete search history.

(56) References Cited

U.S. PATENT DOCUMENTS

| | | | | |
|---|---|---|---|---|
| 10,391,489 | B2 * | 8/2019 | Wright | B01L 3/505 |
| 2008/0177246 | A1 * | 7/2008 | Sullivan | A61M 5/30 604/116 |
| 2014/0194305 | A1 * | 7/2014 | Kayyem | B01L 3/502784 506/18 |
| 2016/0296930 | A1 * | 10/2016 | Matear | B01L 3/527 |
| 2017/0259268 | A1 * | 9/2017 | Wright | B01L 3/50273 |

FOREIGN PATENT DOCUMENTS

| | | | |
|---|---|---|---|
| WO | 2017/019625 | A1 * | 2/2017 |
| WO | 2020/132008 | A1 * | 6/2020 |

* cited by examiner

*Primary Examiner* — Maureen Wallenhorst

(57) ABSTRACT

A blister actuator assembly for actuating a blister assembly of a diagnostic cartridge assembly and dispensing fluid from the blister assembly is provided. The blister actuator assembly includes an articulated actuator having a drive body and a plurality of driven links. The drive body is configured to translate generally along a first axis from a non-deployed position to a deployed position upon being acted on by an actuation force directed generally along the first axis. The driven links extend in inclined relation from the drive body, with the driven links being configured to pivot relative to the drive body into forcible engagement with the blister assembly to dispense fluid from the blister assembly in response to the drive body translating along the first axis.

25 Claims, 9 Drawing Sheets

DIAGNOSTIC ASSAY AND THERAPEUTIC FLUID DELIVERY BLISTER ACTUATOR AND DIAGNOSTIC ASSAY AND THERAPEUTIC FLUID DELIVERY CARTRIDGE THEREWITH

BACKGROUND

1. Field of the Invention

The present disclosure relates generally to diagnostic assay and therapeutic fluid delivery devices. More particularly, the present disclosure is directed to actuation mechanisms and methods for controlling delivery of fluid from blisters of diagnostic assay and therapeutic fluid delivery devices.

2. Related Art

Self-contained medical devices are growing in popularity as decentralization of therapeutic and diagnostic devices are deployed to the point of interest or care. Many of these therapeutic and diagnostic devices, referred to generally as diagnostic assay and therapeutic fluid delivery devices, contain on-board fluid vessels in the form of aluminum or other collapsible or deformable material. The aforementioned fluid vessels are commonly referred to as "blisters" in the field of this disclosure. Blisters are expected to facilitate controlled delivery, including rate and volume, of fluid for performing diagnostic assays and therapeutic fluid delivery. Current practices for deforming or collapsing blisters utilize a number of methods and mechanisms ranging from utilization of discrete actuator motors to complex mechanical mechanisms. Although the known methods and mechanisms can prove useful, they typically require high capital investment and increased complexity of method of actuation and design of the mechanisms. Currently, no standards of practice have been adopted to perform the action of opening and dispensing fluid and other constituents from the blisters for performing diagnostic assays and delivery of fluid for therapeutic treatments.

The disclosure described herein provides an accurate (rate and volume), reliable and repeatable, economically low-cost (in manufacture and use), and standardizable mechanism and method for performing diagnostic assays and delivery of fluid for therapeutic treatments.

SUMMARY

In accordance with an aspect of the disclosure, a cartridge assembly comprised of a drive body and a series of pivotable links, which when the body is translated and the pivotable links pivoted, perform a sequential order of functions in the form of work upon at least one fluid containing blister on diagnostic device or therapeutic device to dispense the fluid from the blister(s) at a controlled rate and volume.

In accordance with another aspect of the disclosure, an assembly comprised of a drive body and an articulated pivotable link or series of links provide exponentially increasing force against a fluid containing blister which requires increased force as it is collapsed or crushed.

In accordance with another aspect of the disclosure, a diagnostic assembly blister actuator for actuating a blister assembly of a diagnostic assembly and dispensing fluid from the blister assembly is provided. The diagnostic assembly blister actuator includes an articulated actuator having a drive body and a plurality of driven links. The drive body is configured to translate generally along a first axis from a non-deployed position to a deployed position upon being acted on by an actuation force directed generally along the first axis. The driven links extend in inclined relation from the drive body, with the driven links being configured to pivot relative to the drive body into forcible engagement with the blister assembly to dispense fluid from the blister assembly in response to the drive body translating along the first axis.

In accordance with another aspect of the disclosure, the plurality of driven links includes a first link assembly configured for operable engagement with an actuation blister of the blister assembly, and a second link assembly configured for operable engagement with a main fluid blister of the blister assembly.

In accordance with another aspect of the disclosure, the first link assembly is configured to engage the actuation blister prior to the second link assembly engaging the main fluid blister, thereby ensuring the actuation blister becomes activated (opened), prior the main fluid blister being compressed to urge fluid contained therein from the main fluid blister through a microfluidic channel(s) extending from the blister assembly.

In accordance with another aspect of the disclosure, the first link assembly and the second link assembly are connected to the drive body by hinges.

In accordance with another aspect of the disclosure, the first link assembly and the second link assembly can be formed as a monolithic piece of material with said drive body, wherein the hinges are living hinges.

In accordance with another aspect of the disclosure, the drive body can be provided as a single body having planar opposite sides.

In accordance with another aspect of the disclosure, one of the planar sides of the drive body can be configured for sliding movement along an underside of a cover of the diagnostic assembly, and the other of the planar sides of the drive body can be hingedly attached to the first link assembly and the second link assembly.

In accordance with another aspect of the disclosure, the first link assembly and the second link assembly can be hinged to pivot about a common hinge axis.

In accordance with another aspect of the disclosure, the first link assembly extends from the drive body to free end having a first plunger pad fixed thereto, with the first plunger pad being configured for engagement with the actuation blister of the blister assembly, and wherein the second link assembly extends from the drive body to free end having a second plunger pad fixed thereto, with the second plunger pad being configured for engagement with a main fluid blister of the blister assembly.

In accordance with another aspect of the disclosure, the first plunger pad and the second plunger pad translate along a second axis in response to the drive body translating along the first axis.

In accordance with another aspect of the disclosure, the second axis is generally transverse to the first axis.

In accordance with another aspect of the disclosure, the first link assembly includes a plurality of first link arms and the second link assembly includes a plurality of second link arms, wherein the plurality of first link arms extend from the drive body to the first plunger pad, and wherein the plurality of second link arms extend from the drive body to the second plunger pad.

In accordance with another aspect of the disclosure, the plurality of first link arms are spaced from one another in generally parallel relation with one another and the plurality of second link arms are spaced from one another in generally parallel relation with one another.

In accordance with another aspect of the disclosure, the plurality of first link arms and the plurality of second link arms extend in non-parallel relation with one another when the drive body is in the non-deployed position.

In accordance with another aspect of the disclosure, the plurality of first link arms are connected to the drive body by hinges and to the first plunger by hinges, and wherein the plurality of second link arms are connected to the drive body by hinges and to the second plunger by hinges.

In accordance with another aspect of the disclosure, each of the hinges can be provided as a living hinge.

In accordance with another aspect of the disclosure, the first plunger pad and the second plunger extend in generally parallel relation with the drive body.

In accordance with another aspect of the disclosure, the plurality of first link arms, the first plunger pad and the drive body form a polygon as viewed along an axis extending transversely to the first axis and the plurality of second link arms, wherein the second plunger pad and the drive body form a polygon as viewed along an axis extending transversely to the first axis, wherein each of the polygons can be shaped as a parallelogram.

In accordance with another aspect of the disclosure, the blister actuator assembly further includes a support plate configured for fixed attachment to a cover of the diagnostic assembly, wherein the first link assembly includes a plurality of first support arms and the second link assembly includes a plurality of second support arms, wherein the plurality of first support arms extend from the drive body to the support plate, and the plurality of second support arms extend from the drive body to the support plate.

In accordance with another aspect of the disclosure, the plurality of first link arms and the plurality of first support arms mirror each other across the drive body, and the plurality of second link arms and the plurality of second support arms mirror each other across the drive body.

In accordance with another aspect of the disclosure, the support plate, the first plunger pad and the second plunger pad are fixed against movement along a direction of the first axis.

In accordance with another aspect of the disclosure, the first plunger pad and the second plunger pad translate along a second axis in response to the drive body translating along the first axis.

In accordance with another aspect of the disclosure, the second axis along which the first plunger pad and the second plunger pad translate is generally transverse to the first axis along which the drive body translates.

In accordance with another aspect of the disclosure, the plurality of first support arms, the support plate and the drive body form a polygon as viewed along an axis extending transversely to the first axis and the plurality of second support arms, the support plate and the drive body form a polygon as viewed along an axis extending transversely to the first axis, wherein each polygon can be shaped as a parallelogram.

BRIEF DESCRIPTION OF THE DRAWINGS

These and other aspects, features and advantages of the present disclosure will become more readily appreciated when considered in connection with the following detailed description of presently preferred embodiments and best mode, appended claims and accompanying drawings, in which:

DETAILED DESCRIPTION OF EXAMPLE EMBODIMENTS

Figure 1:
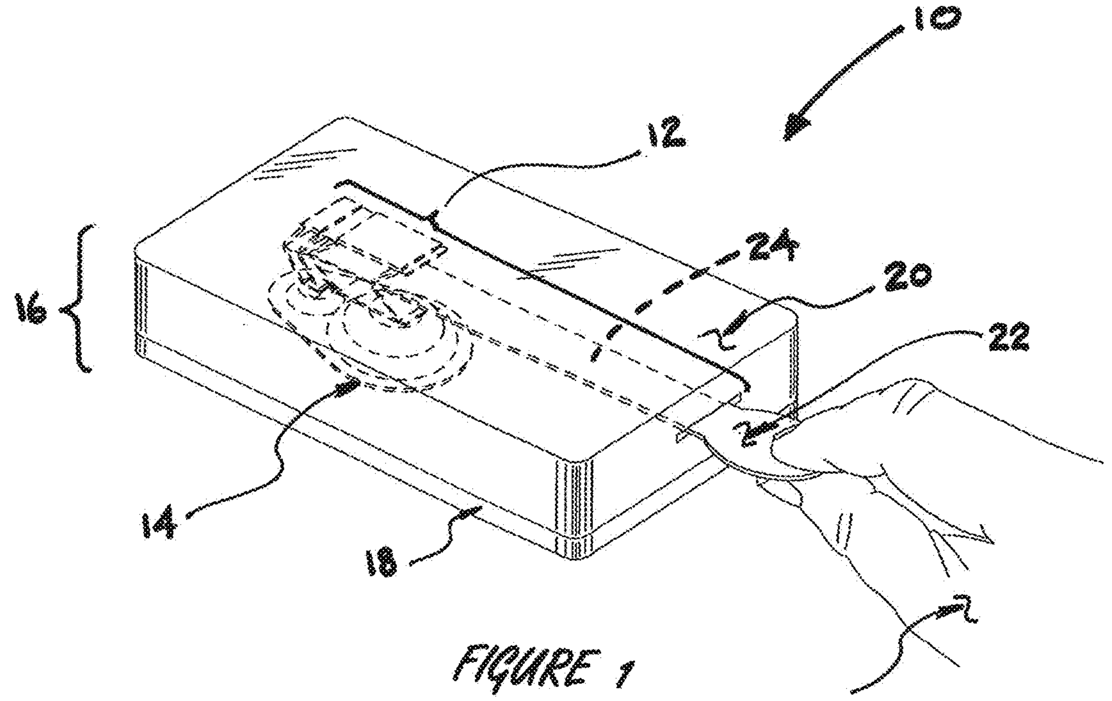
FIG. 1 depicts a closed fluidic cartridge 10 comprised of a fluidic cartridge cover 20 and a fluidic cartridge base 18 and containing an articulated actuator 12 acting upon a blister assembly 14.
Figure 2:
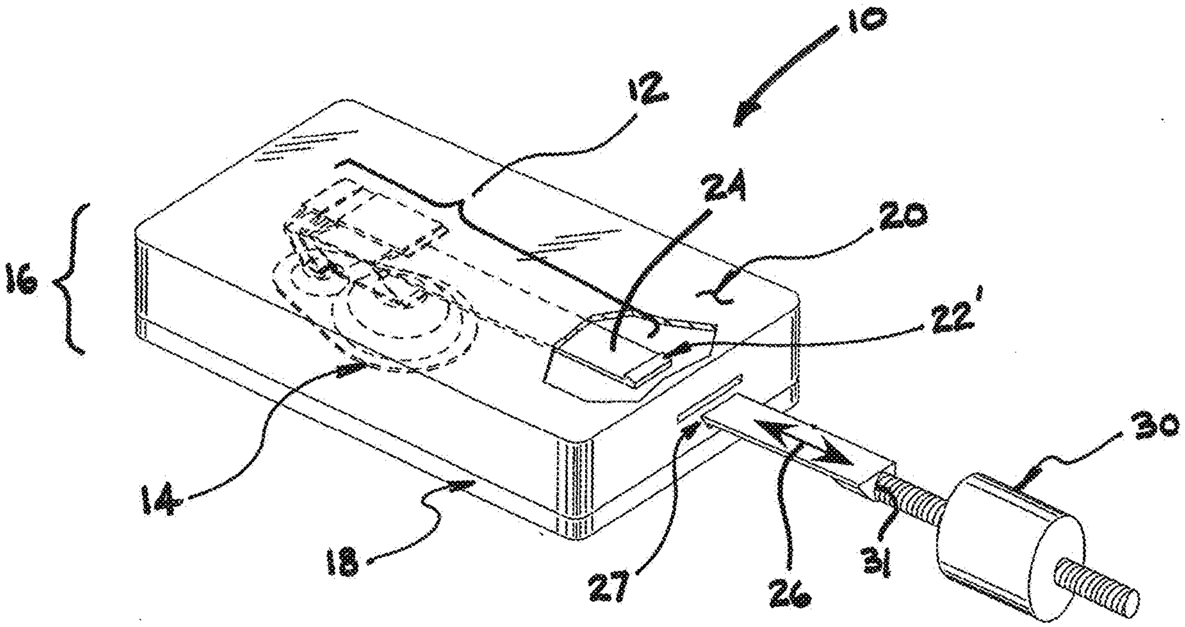
FIG. 2 depicts a similar closed fluidic cartridge 10 as shown in FIG. 1 with the addition of an actuator coupling latch 22' coupled to an automated actuator latch 27 and actuated by an automatic power-actuated actuator motor or other power actuated mechanism.
Figure 3:
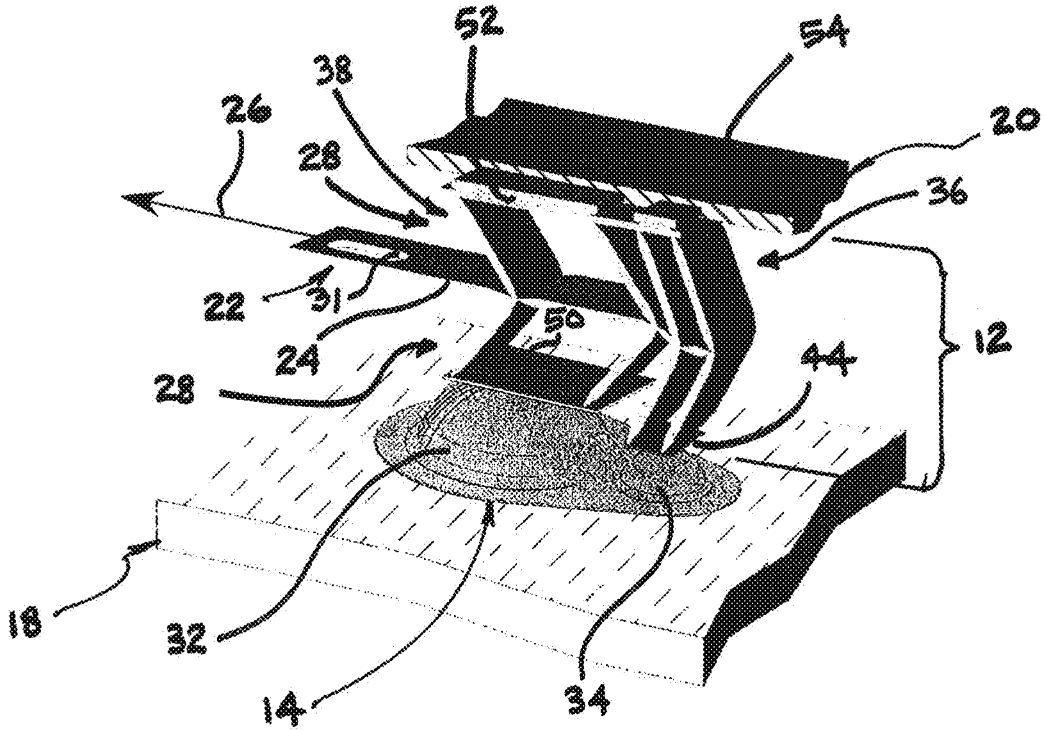
FIG. 3 depicts a compound articulated actuator assembly 12 mounted to the fluidic cartridge cover 20 and is comprised of compound toggle links 28 which are actuated in the direction of the arrow when a force is applied to a first end 22 of a drive body 24.
Figure 10:
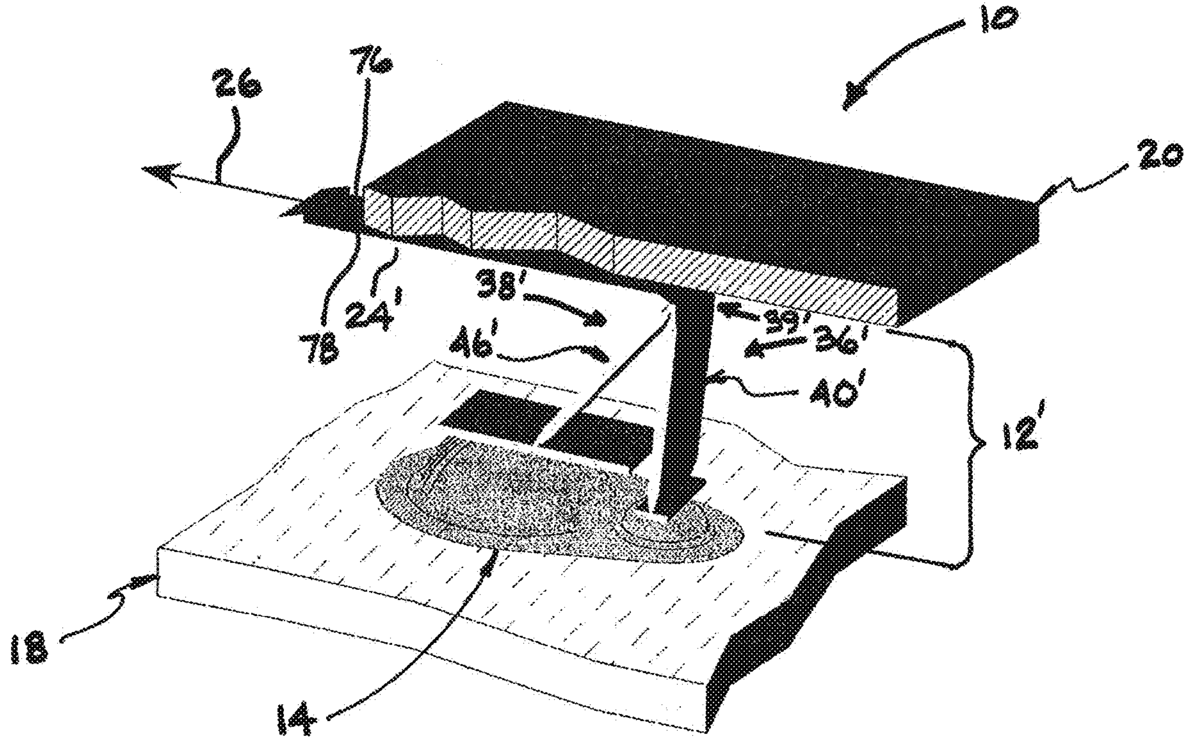
FIG. 10 depicts an articulated actuator assembly 12' as generally described in FIG. 3 but consisting of a single set of toggle links 40' which are actuated in the direction of the arrow when a force is applied to the actuator pull tab of the drive body 24' which slides along a low friction surface on the inner face of the fluidic cartridge cover 20.
Figure 4:
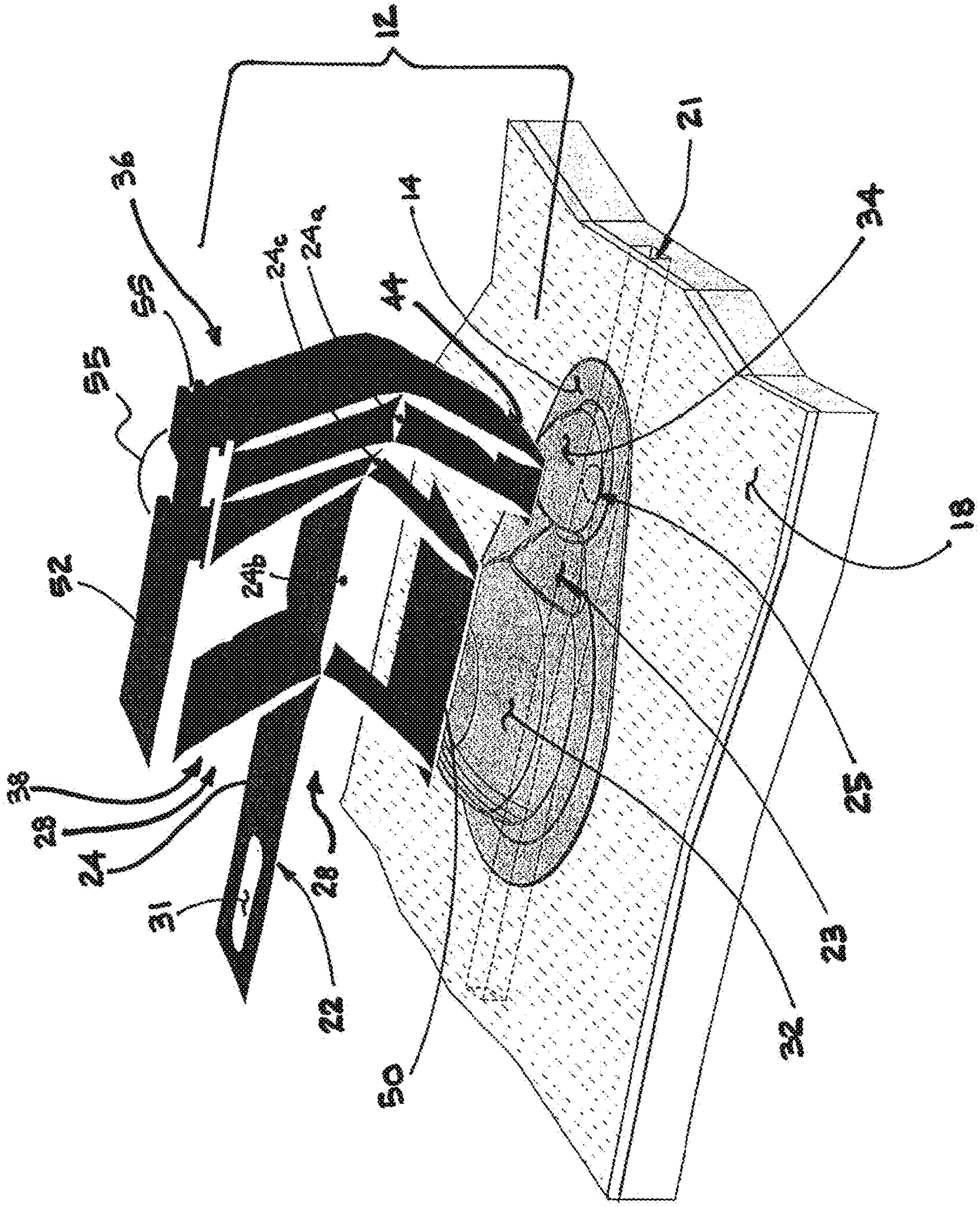
FIG. 4 is an isolated view of an articulated actuator assembly 12 with compound toggle links 28.

Referring in more detail to the drawings, FIGS. 1 and 2 illustrate a diagnostic assay and/or therapeutic cartridge assembly, referred to hereafter as diagnostic assembly 10, having a diagnostic assay and/or therapeutic assembly blister actuator assembly, referred to hereafter as articulated actuator or blister actuator assembly 12, for actuating at least one blister assembly 14 of the diagnostic assembly 10 and dispensing fluid from the blister assembly 14 for performing diagnostic assays and/or delivery of fluid for performing therapeutic treatments. The diagnostic assembly 10 includes a housing, also referred to as cartridge 16, having a base 18 and a cover 20 fixed to one another. At least one or more micro-fluidic channels 21 extend from the blister assembly 14 to an analysis chamber or dispensing port (not shown, can be in the assembly 10 or external thereof). The micro-fluidic channel(s) 21 can be formed in the base 18 and/or cover 20. The fluid within the blister assembly 14, upon actuating the blister actuator assembly 12 from a non-deployed position (FIG. 1) to a deployed position (FIG. 2), flows through an internal conduit 23 of the blister assembly 14, through a fluid entry port 23 of the microfluidic channel(s) 21, through the micro-fluidic channel(s) 21 and into the analysis chamber or through the dispensing port.

The blister actuator assembly 12 can be configured to be actuated by an actuation mechanism, such as a person's fingers pulling on an actuator pull tab 22 located at a free first end of an actuator body, also referred to as drive body 24, shown as being generally planar, sheet-like members, thereby applying an actuation force F acting along a direction of a longitudinal axis, also referred to as first axis 26, of the drive body 24. It is to be recognized that any suitable actuation mechanism can be used, included power-operated actuation mechanisms 30 (FIG. 2) fixed to a coupling feature 31 or other manual actuation mechanisms, as desired.

The blister actuator assembly 12 includes the drive body 24 and a plurality of driven links 28. The drive body 24 is configured to translate generally along the direction of the first axis 26 from the non-deployed position to the deployed position upon being acted on by an actuation force (persons fingers, power-operated mechanism or the like) directed generally along the first axis 26 or in generally parallel relation to the first axis 26. The driven links 28, extending in inclined relation from the drive body 24, shown as oblique relation from the drive body 24, are configured to pivot relative to the drive body 24 into forcible engagement with the blister assembly 14 to dispense fluid from the blister assembly 14 in response to the drive body 24 translating along the direction of the first axis 26.

The blister assembly 14 is shown, by way of example and without limitation, as having a main fluid blister 32 and an actuation blister 34, wherein the internal conduit 23 brings the main fluid blister 32 into fluid communication with the actuation blister 34. The main fluid blister 32 contains the majority of the fluid supply within the blister assembly 14, while the actuation blister 34 provides a mechanism for opening the blister assembly 14 to allow the fluid to be channeled through the internal conduit 23, through the entry port 25 and into the micro-fluidic channel(s) 21 upon actuating the blister assembly 14 with the blister actuator assembly 12. It is to be understood that the fluid is hermetically contained within the blister assembly 14 up until the moment of intentionally actuating the blister assembly 14 with the blister actuator assembly 12. Any suitable mechanism can be provided for opening the entry port 25 upon moving the blister actuator assembly 12 from the non-deployed position to the deployed position.

Figure 5:
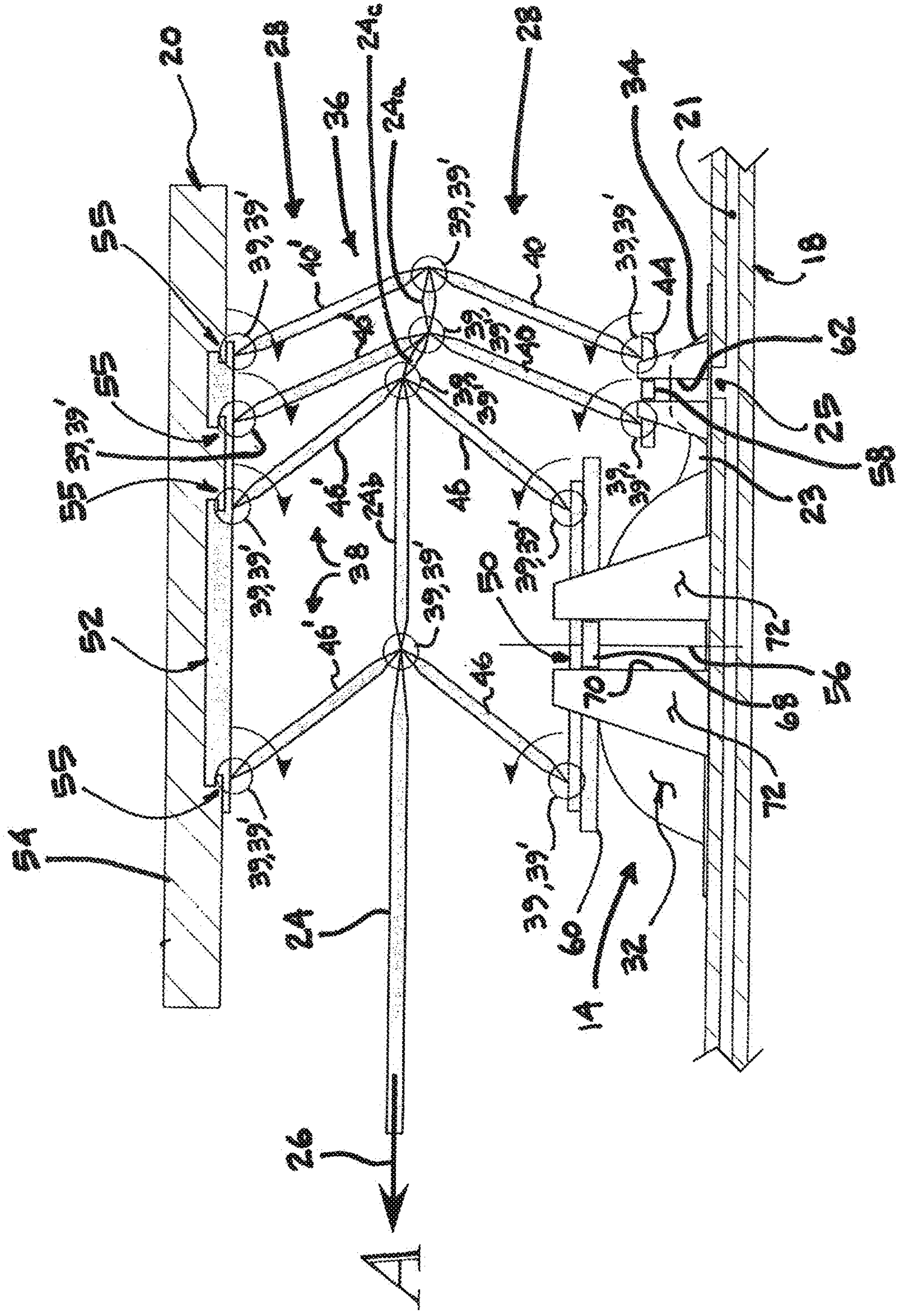
FIG. 5 is a side view of a compound articulated actuator assembly 12 illustrating toggle pivots 39 of the toggle links 28 denoted.
Figure 6:
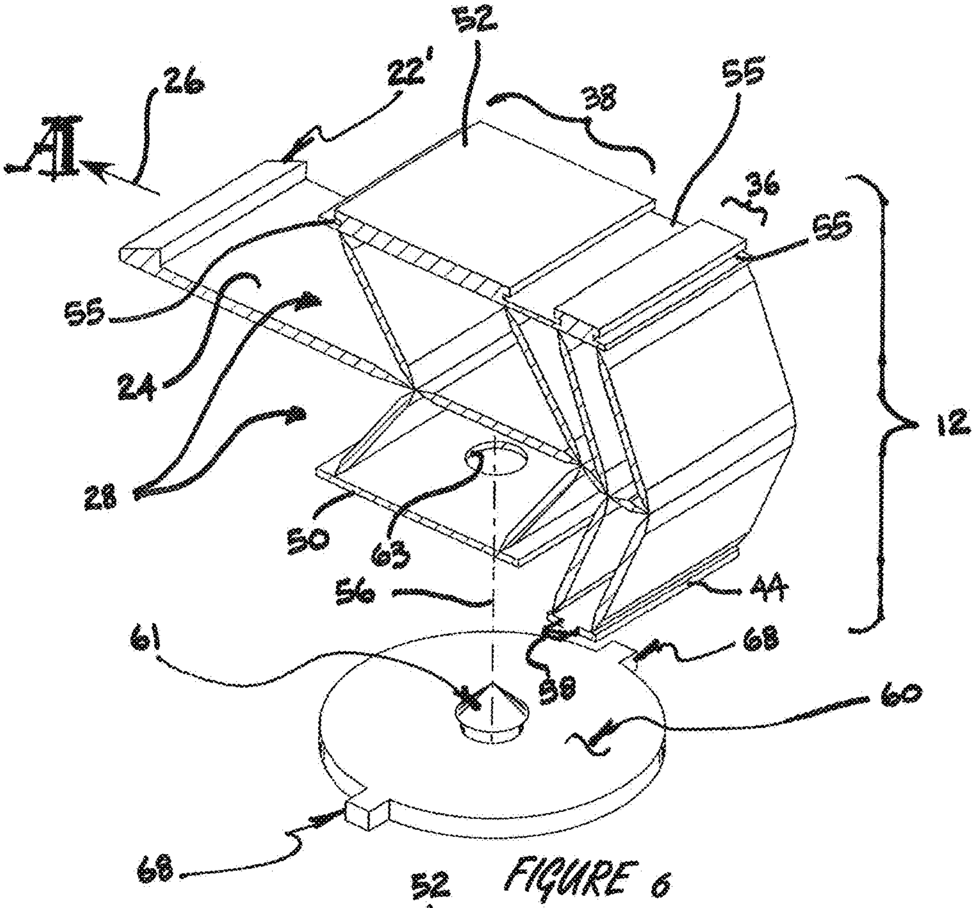
FIG. 6 depicts the articulated actuator assembly 12 with a blister fluid chamber depression foot 50 having a connection feature 61 received by a mating feature 63 in the articulated actuator foot 50 with vertical guide tabs 68.
Figure 7:
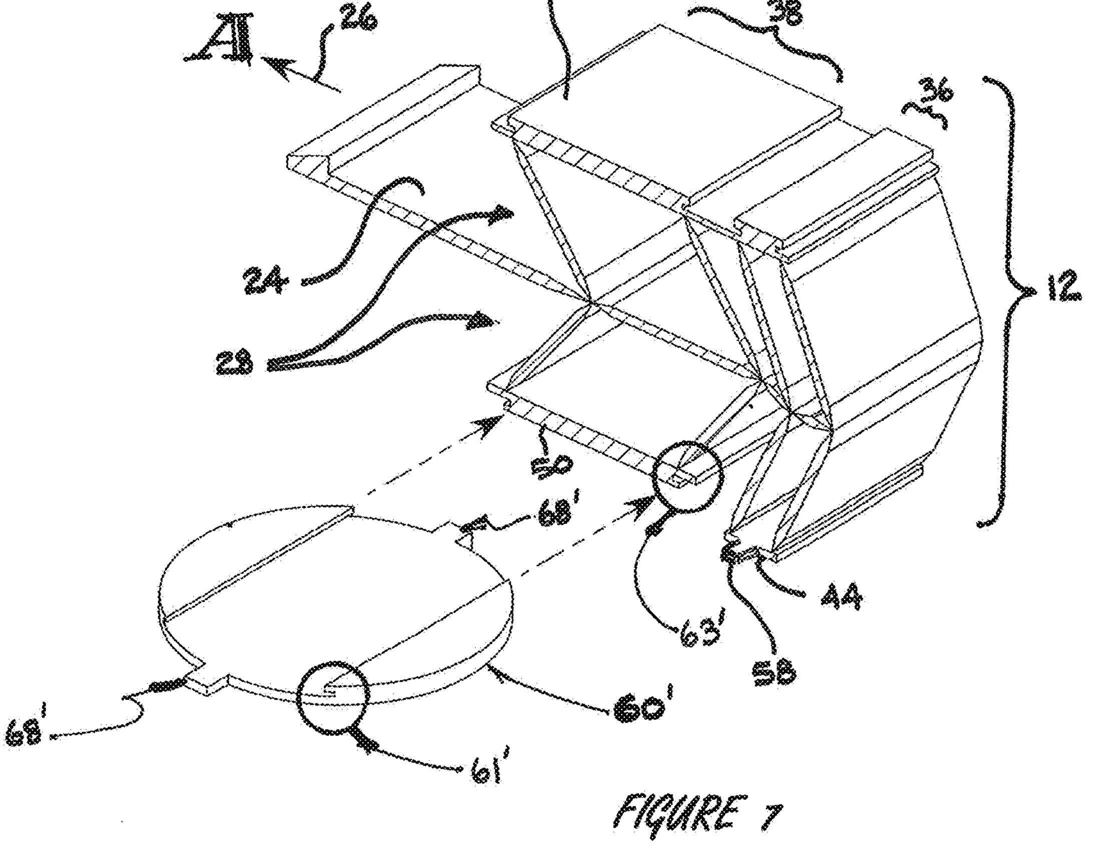
FIG. 7 depicts an articulated actuator assembly 12 with a blister fluid chamber depression foot 50 containing "T" slots which couple to the "T" slot receiver features in the blister fluid chamber depression foot 50.
Figure 8:
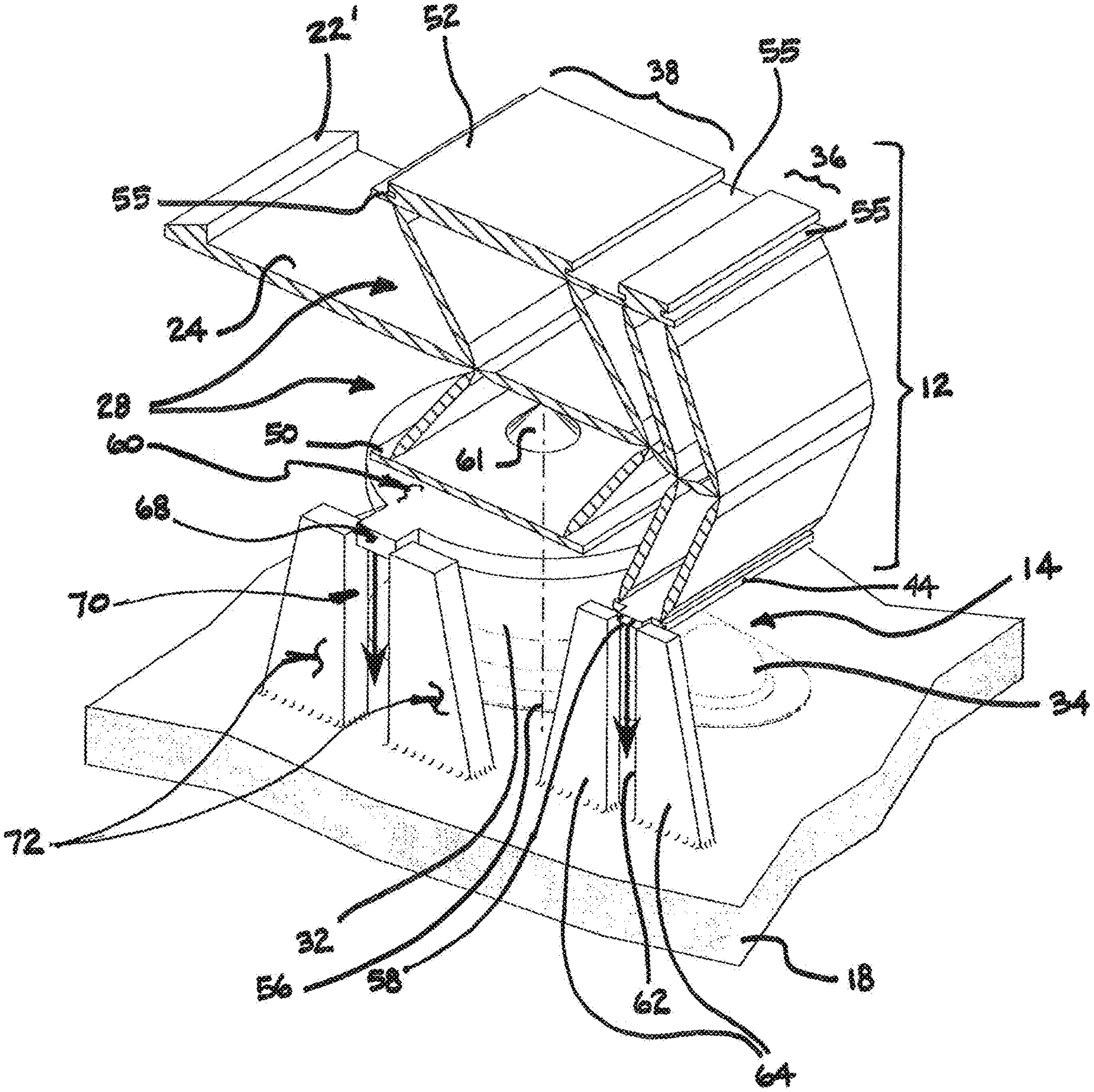
FIG. 8 depicts the articulated actuator assembly 12 with the blister fluid chamber depression foot 50 operably attached to vertical guide tabs 68 translating downward in the direction of the arrows in vertical guide slots 70 formed by opposing vertical guide buttresses 72.

The plurality of driven links 28 includes a first link assembly 36 configured for operable engagement with the actuation blister 34 of the blister assembly 14, and a second link assembly 38 configured for operable engagement with the main fluid blister 32 of the blister assembly 14. The first link assembly 36 and the second link assembly 38 are connected to the drive body 24 by hinges 39 (FIG. 5). The first link assembly 36 and the second link assembly 38 can be formed as a monolithic piece of material with the drive body 24, and thus, in this case, the hinges are provided as living hinges (living hinges herein is intended to mean the hinges 39 are formed of the same, monolithic piece of material as the drive body 24, the first link assembly 36 and the second link assembly 38, wherein the living hinges 39 can be reduced in thickness to facilitate pivotal movement of the first link assembly 36 and the second link assembly 38 relative to the drive body 24 during actuation of the blister actuator assembly 12). However, it is contemplate herein that the first link assembly 36 and the second link assembly 38 can be formed as a separate piece of material from the drive body 24, and thus, the hinges could be formed as separate pieces of material from the drive body 24, the first link assembly 36 and the second link assembly 38. If provided as separate pieces of material, the hinges could be formed of a flexible fabric, such as a textile layer or film layer, or as mechanical hinges, such as those including pins and knuckles, by way of example and without limitation.

The first link assembly 36 includes a plurality of first link arms 40, shown as being generally planar, sheet-like members, that each extend from the drive body 24 to a free end 42 having a first plunger actuator, also referred to as first foot or first plunger pad 44, fixed thereto via hinges 39, as discussed above. The first plunger pad 44, shown as being generally planar, sheet-like member, is configured for engagement with the actuation blister 34 of the blister assembly 14. The second link assembly 38 includes a plurality of second link arms 46, shown as being generally planar, sheet-like members, that each extend from the drive body 24 to a free end 48 having a second plunger actuator, also referred to as second foot or second plunger pad 50 fixed thereto via hinges 39, as discussed above. The second plunger pad 50, shown as being generally planar, sheet-like member, is configured for engagement with the main fluid blister 32 of the blister assembly 14. With the drive body 24, the first and second link arms 40, 46, and the first and second plunger pads 44, 50 being planar, sheet-like members, the hinges 39 therebetween can be provided to extend along straight, elongate hinge axes, also referred to as second axes 39' (FIG. 5), wherein the second axes 39' are generally parallel to one another, and extend generally transversely to the first axis 26.

The plurality of first link arms 40 are spaced from one another in generally parallel relation with one another and the plurality of second link arms 46 are spaced from one another in generally parallel relation with one another. The plurality of first link arms 40, shown as a pair of first link arms 40 in one exemplary embodiment, and the plurality of second link arms 46, shown as a pair of second link arms 46 in the exemplary embodiment, extend in non-parallel relation relative to one another when the drive body 24 is in its non-deployed position (FIG. 5). The respective lengths of the first and second link arms 40, 46 can be provided as desired to provide the desired timing of actuation of the actuation blister 34 and the main fluid blister 32. Additionally, the drive body 24 can be segmented along its axially extending length (axially extending length is measured along the first axis 26) to provide discrete segments that pivot relative to one another during actuation of the blister actuator assembly 12. In the exemplary embodiment shown, as best identified in FIG. 5, the drive body 24 has a first segment **24*a* extending between the pair of first link arms 40 and being connected to first link arms 40 via hinges 39, as discussed above, a second segment 24*b* extending between the pair of second link arms 46 and being connected to the second link arms 46 via hinges 39, as discussed above, and joining segment, also referred to as third segment 24*c* extending between and interconnecting the first link assembly 36 to the second link assembly 38 and being connected to the first link assembly 36 and the second link assembly 38 via hinges 39, as discussed above. The configuration of the first and second link assemblies 36, 38 and the hinges 39 allow the first plunger pad 44 and the second plunger pad 50 to extend in generally parallel relation with one another and with the drive body 24 throughout actuation of the blister actuator assembly 12, thereby applying a normal (transverse) force to the respective actuation blister 34 and main fluid blister 32**.

The first link arms 40, the first plunger pad 44 and the drive body 24 form a polygon, and the second link arms 46, the second plunger pad 50 and the drive body 24 form a polygon, as best viewed along an axis extending generally transversely to the first axis in FIG. 5. With the first link arms 40 being parallel to one another and the drive body 24 and the first plunger pad 44 being parallel to one another, and the second link arms 46 being parallel to one another and the drive body 24 and the second plunger pad 50 being parallel to one another, the polygons are formed as a parallelogram.

In the embodiment of FIGS. 3-9, a support plate 52 is configured for fixed attachment to a portion of a housing of the blister diagnostic assembly 12, shown, by way of example and without limitation, as a cover 54 of the diagnostic assembly 12, wherein the fixed attachment prevents relative movement between the support plate 52 and the cover 54. The mechanism of fixed attachment can be provided as desired, using any suitable mechanical fastener, adhesive, weld or the like. In the embodiment shown, a keyed, dovetail-type mechanism 55 is provided to allow the blister actuator assembly 12 to be slide along the axis extending transversely to the first axis 26, as viewed in FIG. 5, such that the support plate 52 is fixed against movement along the first axis 26. The first link assembly 36 includes a plurality of first support arms 40' (FIG. 5) and said second link assembly 38 includes a plurality of second support arms 46' (FIG. 5). The first support arms 40' extend from the drive body 24 to the support plate 52 and the second support arms 46' extend from the drive body 24 to the support plate 52. In the exemplary embodiment illustrated, the plurality of first link arms 40 and the plurality of first support arms 40' mirror each other across the drive body 24, and the plurality of second link arms 46 and the plurality of second support arms 46' mirror each other across the drive body 24. As such, as viewed in FIG. 5, the first support arms 40', the support plate 52 and the drive body 24 form a polygon as viewed along the axis extending transversely to the first axis 26, and the plurality of second support arms 46', the support plate 52 and the drive body 24 form a polygon as viewed along the axis extending transversely to the first axis 26, wherein the polygon is shown as a parallelogram.

The support plate 52, the first plunger pad 44 and the second plunger pad 50 are fixed against movement along a direction of the first axis 26 during actuation of the blister actuator assembly 12. Although not being movable along the first axis 26, the first plunger pad 44 and the second plunger pad 50 translate along a direction of a second axis 56 in generally parallel relation thereto in direct response to the drive body 24 being acted on by the actuation force and translating along the first axis 26. The second axis 56 is shown as extending transverse or generally transverse (meaning that the second axis 56 could be a 0-5 degrees off true perpendicular to the first axis 26) to the first axis 26. To facilitate maintaining the support plate 52, first plunger pad 44, and the second plunger pad 50 fixed against movement along a direction of the first axis 26 during actuation of the blister actuator assembly 12, as noted above, in addition to the support plate 52 being in fixed attachment to the cover 54, the first plunger pad 44 and the second plunger pad 50 are guided for movement along the second axis 56 by at least one guide member, shown as a first guide member 58 on the first plunger pad 44 and a foot plate, also referred to as second guide member 60 (FIG. 6), 60' (FIG. 7), on the second plunger pad 50. The difference between second guide members 60, 60' is solely with regard to their mechanism for fixed attachment to the second plunger pad 50, as shown. The second guide member 60 has a snap feature 61, shown as being conical in shape, by way of example and without limitation, sized for snapping receipt within an opening 63 in the second plunger pad 50, while the second guide member 60' has a dovetail or T-slot joint connection feature in the form of a female T-shaped slot 61' on the second guide member 60' configured for receipt of a T-shaped male rib 63' on the second plunger pad 50. The first guide member 58 is shown as a pair of guide tabs, also referred to as ears (one illustrated, with the other being in mirrored relation), extending laterally outwardly in transverse relation to the first axis 26 for guided receipt within corresponding guide slots 62 formed in a pair of first guide buttresses 64 extending upwardly from base 18. The second guide member 60 is shown having pair of guide tabs, also referred to as ears 68 (one illustrated, with the other being in mirrored relation), extending laterally outwardly in transverse relation to the first axis 26 for guided receipt within corresponding guide slots 70 formed in a pair second guide buttresses 72 extending upwardly from base 18. It is to be recognized that a reversal of features is contemplated herein, and further, that the ears 68 on second guide member 60 could extend directly from the second plunger pad 50, if desired. In similar light, the ears 58 of the first guide member 58 could be formed on a foot plate, such as described for the second guide member 60.

Figure 9A:
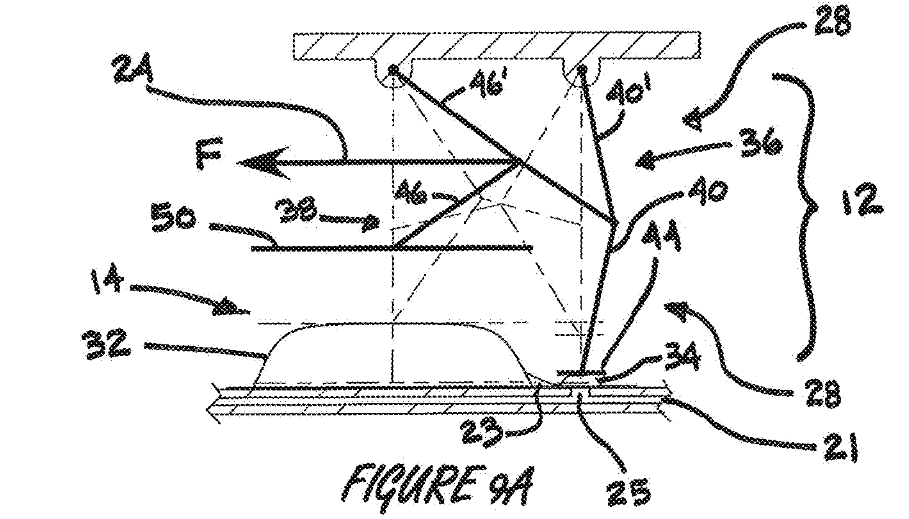
FIG. 9A depicts a compound link articulated actuator assembly 12 in the initial state with a blister valve platen 44 touching the top of an actuation blister valve dimple 34 and with an articulated fluid blister platen 50 in a retracted position.
Figure 9B:
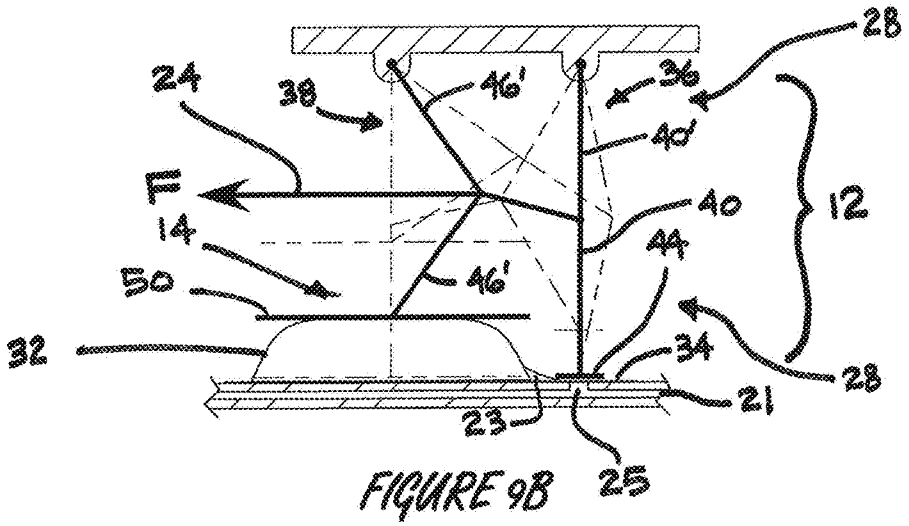
FIG. 9B depicts the compound link articulated actuator assembly 12 in the second state with the blister valve platen 44 having opened the actuation blister valve dimple 34 by crushing the actuation blister valve dimple 34 and with the articulated fluid blister platen 50 in initial contact with the main fluid blister 32.
Figure 9C:
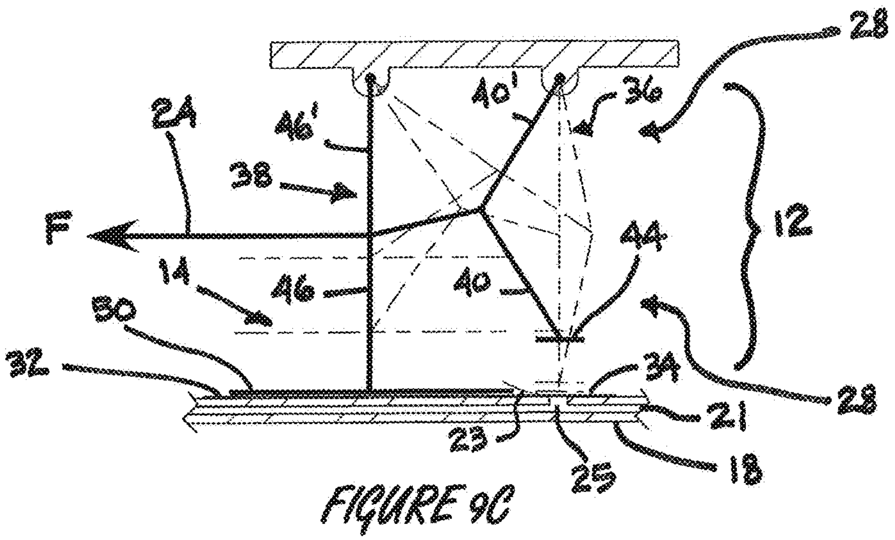
FIG. 9C depicts the compound link articulated actuator assembly 12 in the third and final state with the blister valve platen 44 retracted from top of the actuation blister valve dimple 34 and the articulated fluid blister platen 50 in a fully deployed position.
Figure 12:
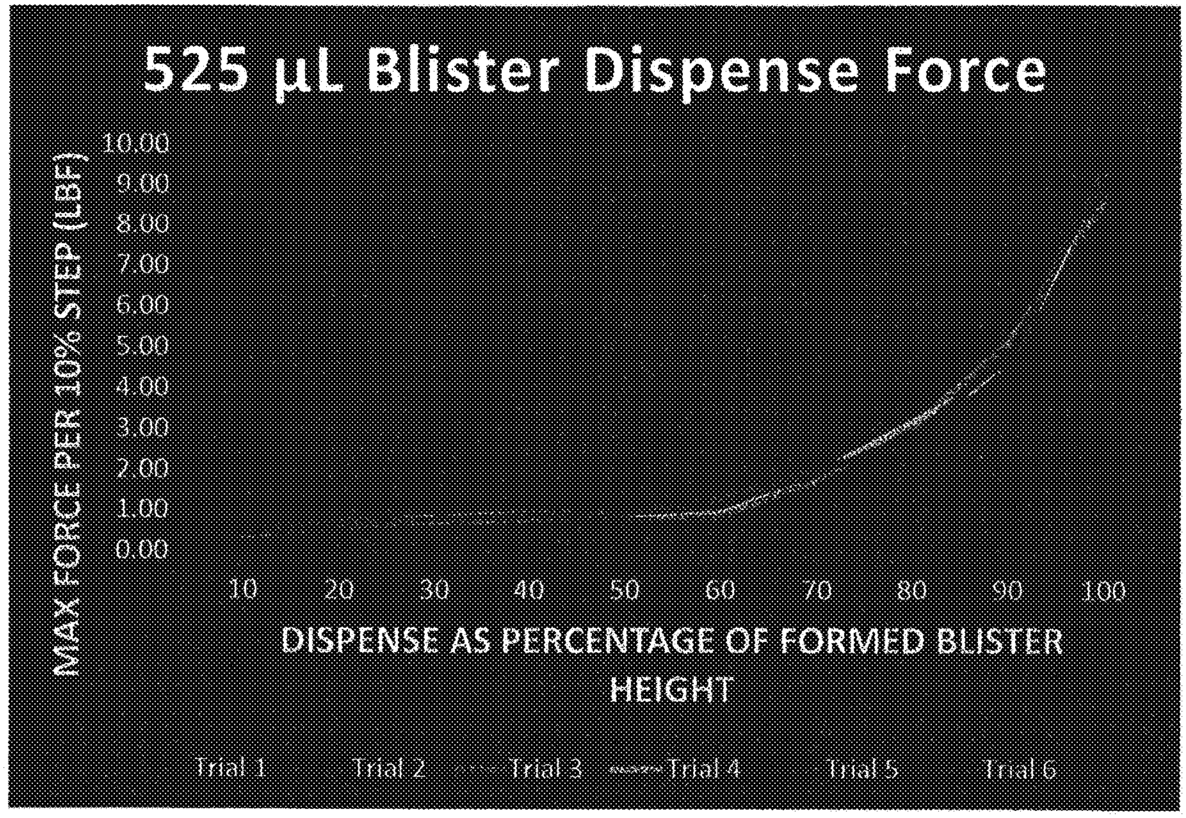
FIG. 12 is data supporting that an exponentially increasing amount of force is required to collapse or depress a blister throughout the stroke, wherein the toggle-based articulated blister actuator assembly provides exponential forces by nature of the geometric configuration of link arms and plunger pads thereof.

In use, as shown in FIGS. 9A-9C, wherein the embodiment of FIGS. 3-8 is schematically illustrated, the actuator (manual or power-operated) applies a force F on drive body 24 to translate drive body 24 along the first axis 26. As drive body 24 is driven along the first axis 26, the first link assembly 36 is driven to cause the first plunger pad 44 to depress and actuate the actuation blister 34, thereby causing the entry port 25 to become opened, thus, allowing fluid from the main fluid blister 32 to flow therethrough. Upon the first plunger pad 44 acting on the actuation blister 34 sufficiently to open the entry port 25, continued translation of drive body 24 causes the first plunger pad 44 to lift vertically away from the actuation blister 34, while concurrently or immediately thereafter, the second link assembly 38 is driven to cause the second plunger pad 50 to contact, depress and actuate the main fluid blister 32 (FIG. 9C). As the second plunger pad 50 is pressed into compressing engagement with the main fluid blister 32, the fluid therein is caused to flow through the internal conduit 23 and through the entry port 25 into the micro-fluidic channel(s) 21. The force applied to main fluid blister 32 exponentially increases (FIG. 12) in predetermined magnitude as the drive body 24 is translated along the first axis 26 and as the second plunger pad 50 moves vertically (as viewed in the FIGS.) from initial engagement with the main fluid blister 32 (FIG. 9A) to fully depressed engagement with the main fluid blister 32 (FIG. 9C). As such, precise and reliable actuation of the blister assembly 14 is performed.

FIGS. 10 and 11A-11C illustrate a blister actuator assembly 12' of a diagnostic assembly 10' constructed in accordance with another aspect of the disclosure. The function of blister actuator assembly 12' is generally the same as discussed above for the blister actuator assembly 12, with some difference in structure discussed hereafter.

Figure 11A:
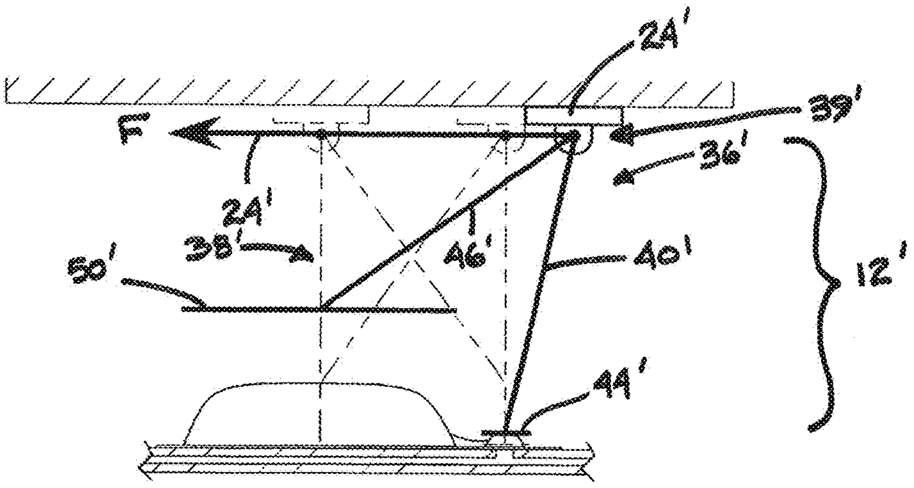
FIG. 11A depicts a single link articulated actuator assembly 12' in the initial state with the blister valve platen 44' touching the top of the actuation blister valve dimple 34 and with the articulated fluid blister platen 50' in a retracted position.
Figure 11B:
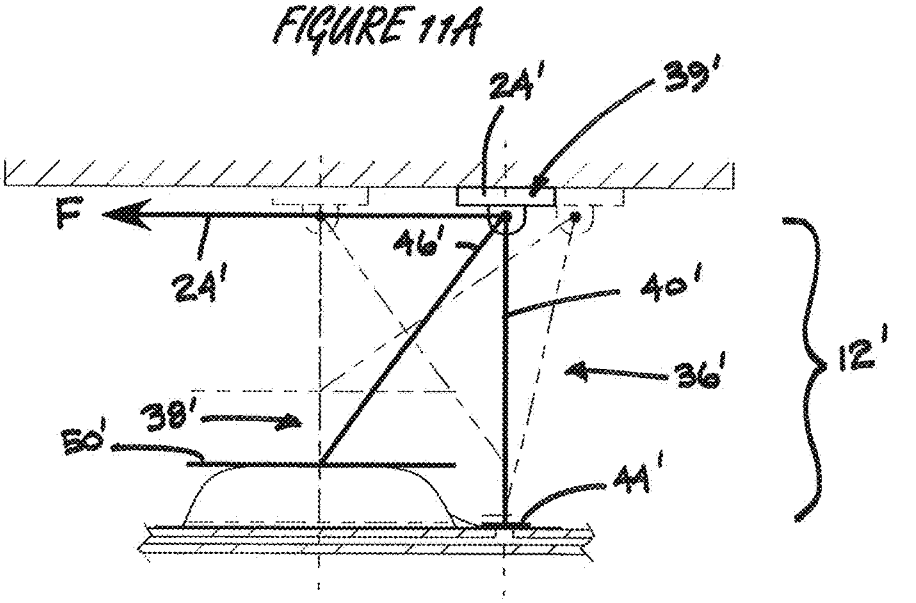
FIG. 11B depicts the single link articulated actuator assembly 12' in the second state with the blister valve platen 44' having open the blister by crushing the actuation blister valve dimple 34 and with the articulated fluid blister platen 50' in initial contact with the main fluid blister fluid blister 32.
Figure 11C:
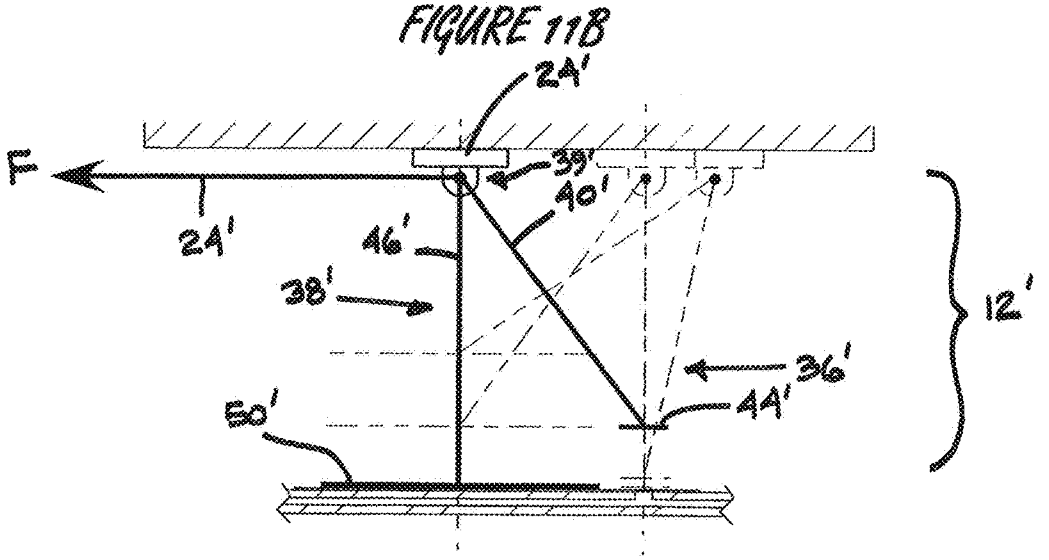
FIG. 11C depicts the single link articulated actuator assembly 12' in the third and final state with the blister valve platen 44' retracted from top of the blister valve dimple 34 and the articulated fluid blister platen 50' in a fully deployed position.

A blister assembly 14 is illustrated, wherein the blister assembly 14 is same as discussed above, and thus, no further discussion here is believed necessary. The blister actuator assembly 12' has a first link assembly 36' and a second link assembly 38'; however, rather than each having a plurality of link arms, the first link assembly 36' and a second link assembly 38' each have a single link arm, shown as a first link arm 40' and a second link arm 46', respectively. The first and second link arms 40', 46' are hingedly fixed to a drive body 24', wherein the drive body 24' is shown as being a single drive body, without segmented section separated by hinges therein as discussed above for drive body 24. The drive body 24' has planar opposite sides 76, 78 wherein one of the planar sides 76 is configured for sliding movement along a cover 20 of the diagnostic assembly 10', and the other of the planar sides 78 is hingedly attached to the first link assembly 36' and the second link assembly 38' via hinges 39', wherein the hinges 39' can be provided as discussed above for the hinges 39. In the illustrated embodiment, the first link assembly 36' and the second link assembly 38' are hinged to pivot about a common hinge axis of hinge 39'. It is to be recognized that separate hinge axes are contemplated herein for the first link assembly 36' and the second link assembly 38'. Other features, such as first and second plunger pads 44', 50', are provided, as illustrated, but are not discussed in detail here, as they can be provided and function in the same way as discussed above for diagnostic assembly 10. The operation of the blister actuator assembly 12' of diagnostic assembly 10' is substantially the same as discussed for the blister actuator assembly 12 of the diagnostic assembly 10, as shown in FIGS. 11A-11C, and thus, repetition of the function is believed unnecessary.

In the above embodiments, the blister actuator assemblies 12, 12' can be constructed as a single piece (monolithic) of material, such as in an extrusion or molding process. As such, the manufacture thereof is economical. In addition to being economical, various configurations, including shapes and sizes of features, can be readily constructed by configuring the die(s) to form the structure desired.

In view of the above, in association with the FIGS., many modifications and variations of the present invention are possible in light of the teachings herein. It is, therefore, to be understood that the invention may be practiced otherwise than as specifically described, and that the scope of the invention is defined by any ultimately allowed claims. In particular, all features of all claims and of all embodiments can be combined with each other, as long as they do not contradict each other.

What is claimed is:

1. A diagnostic assembly blister actuator for actuating a blister assembly of a diagnostic assembly and dispensing fluid from the blister assembly, comprising:

an articulated actuator having a drive body and a plurality of driven links hingedly attached to the drive body, said drive body being configured to translate generally along a first axis from a non-deployed position to a deployed position upon being acted on by an actuation force directed generally along said first axis, and said driven links extending in inclined relation from said drive body and being configured to pivot relative to said drive body into forcible engagement with the blister assembly to dispense fluid from the blister assembly in response to said drive body translating along said first axis;

wherein said plurality of driven links includes a first link assembly configured for operable engagement with an actuation blister of the blister assembly, and a second link assembly configured for operable engagement with a main fluid blister of the blister assembly.

2. The diagnostic assembly blister actuator of claim 1, wherein said first link assembly is configured to engage the actuation blister prior to said second link assembly engaging the main fluid blister.

3. The diagnostic assembly blister actuator of claim 1, wherein said first link assembly and said second link assembly are connected to said drive body by hinges.

4. The diagnostic assembly blister actuator of claim 3, wherein said first link assembly and said second link assembly are formed as a monolithic piece of material with said drive body, wherein said hinges are living hinges.

5. The diagnostic assembly blister actuator of claim 1, wherein said drive body is a single body having planar opposite sides.

6. The diagnostic assembly blister actuator of claim 5, wherein one of said planar sides is configured for sliding movement along a cover of the diagnostic assembly, and the other of said planar sides is hingedly attached to said first link assembly and said second link assembly.

7. The diagnostic assembly blister actuator of claim 6, wherein said first link assembly and said second link assembly are hinged to pivot about a common hinge axis.

8. The diagnostic assembly blister actuator of claim 1, wherein said first link assembly extends from said drive body to a free end having a first plunger pad fixed thereto, said first plunger pad being configured for engagement with the actuation blister of the blister assembly, and wherein said second link assembly extends from said drive body to a free end having a second plunger pad fixed thereto, said second plunger pad being configured for engagement with the main fluid blister of the blister assembly.

9. The diagnostic assembly blister actuator of claim 8, wherein said first plunger pad and said second plunger pad translate along a second axis in response to said drive body translating along said first axis.

10. The diagnostic assembly blister actuator of claim 9, wherein said second axis is generally transverse to said first axis.

11. The diagnostic assembly blister actuator of claim 8, wherein said first link assembly includes a plurality of first link arms and said second link assembly includes a plurality of second link arms, said plurality of first link arms extend from said drive body to said first plunger pad, and said plurality of second link arms extend from said drive body to said second plunger pad.

12. The diagnostic assembly blister actuator of claim 11, wherein said plurality of first link arms are spaced from one another in generally parallel relation with one another and said plurality of second link arms are spaced from one another in generally parallel relation with one another.

13. The diagnostic assembly blister actuator of claim 12, wherein said plurality of first link arms and said plurality of second link arms extend in non-parallel relation with one another when said drive body is in said non-deployed position.

14. The diagnostic assembly blister actuator of claim 11, wherein said plurality of first link arms are connected to said drive body by hinges and to said first plunger pad by hinges, and said plurality of second link arms are connected to said drive body by hinges and to said second plunger pad by hinges.

15. The diagnostic assembly blister actuator of claim 14, wherein each of said hinges is a living hinge.

16. The diagnostic assembly blister actuator of claim 11, wherein said first plunger pad and said second plunger pad extend in generally parallel relation with said drive body.

17. The diagnostic assembly blister actuator of claim 16, wherein said plurality of first link arms, said first plunger pad and said drive body form a polygon as viewed along an axis extending transversely to said first axis and said plurality of second link arms, said second plunger pad and said drive body form a polygon as viewed along an axis extending transversely to said first axis.

18. The diagnostic assembly blister actuator of claim 17, wherein each of said polygon is a parallelogram.

19. The diagnostic assembly blister actuator of claim 11, further including a support plate configured for fixed attachment to a cover of the diagnostic assembly, wherein said first link assembly includes a plurality of first support arms and said second link assembly includes a plurality of second support arms, said plurality of first support arms extend from said drive body to said support plate, and said plurality of second support arms extend from said drive body to said support plate.

20. The diagnostic assembly blister actuator of claim 19, wherein said plurality of first link arms and said plurality of first support arms mirror each other across said drive body, and said plurality of second link arms and said plurality of second support arms mirror each other across said drive body.

21. The diagnostic assembly blister actuator of claim 19, wherein said support plate, said first plunger pad and said second plunger pad are fixed against movement along a direction of said first axis.

22. The diagnostic assembly blister actuator of claim 21, wherein said first plunger pad and said second plunger pad translate along a second axis in response to said drive body translating along said first axis.

23. The diagnostic assembly blister actuator of claim 19, wherein said plurality of first support arms, said support plate and said drive body form a polygon as viewed along an axis extending transversely to said first axis and said plurality of second support arms, said support plate and said drive body form a polygon as viewed along an axis extending transversely to said first axis.

24. An assembly comprising:

an articulated actuator having a drive body, a first link assembly and a second link assembly, the first link assembly having a plurality of first driven links with first pivotable links which are pivotably and hingedly attached to the drive body, the second link assembly having a plurality of second driven links with second pivotable links pivotably and hingedly attached to the drive body, the first driven links extend in non-parallel relation to the second driven links, and wherein the first pivotable links and the second pivotable links are configured to be translated and rotated through a defined path for the purpose of exerting a force on one or more fluid containing members or other components on a diagnostic device or a therapeutic device.

25. An assembly comprising:

an articulated actuator having a drive body, a first link assembly and a second link assembly, the first link assembly having a plurality of first driven links with first pivotable links which are pivotably and hingedly attached to the drive body, the second link assembly having a plurality of second driven links with second pivotable links pivotably and hingedly attached to the drive body, the first driven links extend in non-parallel relation to the second driven links, and wherein the first pivotable links and the second pivotable links are configured to be translated through a defined path in order to perform a sequential order of exerting force upon components on a diagnostic device or a therapeutic device.

* * * * *